3,117,960
WATER-SOLUBLE MONOAZO-DYESTUFFS
Hugo Illy, Riehen, Switzerland, assignor to Ciba Limited, Basel, Switzerland, a company of Switzerland
No Drawing. Filed Oct. 18, 1960, Ser. No. 63,269
Claims priority, application Switzerland Oct. 22, 1959
9 Claims. (Cl. 260—156)

This invention provides valuable water-soluble salts of monoazo-dyestuffs which are free from sulfonic acid groups and correspond to the general formula (1)
$$\left[\begin{array}{c} R_1 \\ R_2-\overset{+}{N}-alkCO-A-N=N-B \\ R_3 \end{array}\right] X^-$$

in which A represents a benzene radical, "alk" represents an alkylene group, especially a methylene or ethylene group, $R_1$ represents a hydrogen atom or advantageously an alkyl group, $R_2$ and $R_3$ each represent an alkyl, cycloalkyl or monocyclic aralkyl group, and in which $R_1$, $R_2$ and $R_3$ may together form with the nitrogen atom a heterocyclic ring, B represents the radical of a heterocyclic coupling component, and X represents an anion.

The invention also provides a process for the manufacture of the above dyestuffs, wherein (a) a diazo-compound of an amine of the formula (2)
$$\left[\begin{array}{c} R_1 \\ R_2-\overset{+}{N}-alkCO-A-NH_2 \\ R_3 \end{array}\right]$$

in which $R_1$, $R_2$ $R_3$, "alk" and A have the meanings given above, is coupled with a heterocyclic coupling component, and both components are free from sulfonic acid groups, or (b) a dyestuff of the general formula (3)    Hal—alkCO—A—N N—B in which "alk," A and B have the meanings given above, and Hal represents a halogen atom, for example, a chlorine or bromine atom, is reacted with a secondary or tertiary amine, or (c) a monoazo-dyestuff of the formula (4)
$$\begin{array}{c} R_1 \\ \diagdown \\ N-alkCO-A-N=N-B \\ \diagup \\ R_2 \end{array}$$

in which $R_1$, $R_2$, "alk," A and B have the meanings given above is treated with an alkylating agent.

In the process under (a) the aminobenzenes of the Formula 2 advantageously contain the amino group in para-position to the —CO-group. The benzene nucleus A may contain as a substituent a halogen atom, nitro group, or lower alkyl or alkoxy group. $R_1$, $R_2$, $R_3$ are advantageously lower alkyl groups, that is, alkyl groups having at most 6 carbon atoms, such as methyl, ethyl, hydroxyethyl, propyl, butyl or hexyl. As examples there may be mentioned the following compounds:

4-amino-α-(N-chloro-trimethylamino)-acetophenone,
4-amino-α-(N-chloro-triethylamino)-acetophenone,
4-amino-α-(N-chloro-pyridino)-acetophenone,
4-amino-3-methyl-α-(N-chloro-trimethylamino)-acetophenone,
4-amino-3-methoxy-α-(N-chloro-trimethylamino)-acetophenone,
4-amino-3-chloro-α-(N-chloro-trimethylamino)-acetophenone,
4-amino-3-bromo-α-(N-chloro-trimethylamino)-acetophenone,
4-amino-2-chloro-α-(N-chloro-trimethylamino)-acetophenone,
4-amino-2:5-dimethyl-α-(N-chloro-trimethylamino)-acetophenone,
4-amino-β-(N-chloro-trimethylamino)-propiophenone,
4-amino-β-(N-chloro-pyridino)-propiophenone,
3-amino-α-(N-chloro-trimethylamino)-acetophenone and
4-amino-α-(N-bromo-diethyl-benzylamino)-acetophenone.

These diazo-components can be obtained by methods in themselves known, for example, by reacting an appropriate 4-acetylamino-benzene with chloracetyl or chloropropionyl chloride, reacting the resulting chloracylaminobenzene with an appropriate tertiary amino, and splitting off the acetyl group.

As heterocyclic coupling components there are advantageously used indoles capable of coupling in the 3-position or indolines capable of coupling in the 5-position. These compounds contained in the 2-position an alkyl or aryl radical which may be substituted. As suitable alkyl radicals there may be mentioned, ethyl, propyl, butyl and especially methyl radicals. Among the aryl radicals there may be mentioned more especially the benzene radical which may be substituted, for example, by a halogen atom or a lower alkyl or alkoxy group. In addition to the aforesaid substituents in the 2-position the indole molecule may contain further substituents.

The —NH-group occupying the 1-position may be substituted or unsubstituted by an alkyl radical, for example, a methyl, ethyl, hydroxyethyl or cyanethyl radical. Substituents may also be present in the benzene nucleus of the indole molecule, for example, a halogen atom or a lower alkyl or alkoxy group. As examples there may be mentioned:

2:5-dimethyl-indole,
2:4-dimethyl-7-methoxy-indole,
2:3-dimethyl-6:7-benzo-indoline,
2-methyl-5-ethoxyindole,
2-methyl-5- or -6-chlorindole,
1:2-dimethyl-indole,
1-methyl-2-phenyl-indole,
2-methyl-5-nitro- or -6-cyanindole,
2-phenyl-indole,
2-methyl-7-chlorindole,
2-methyl-5-fluoro- or -5-brom-indole,
2-methyl-5:7-dichlorindole, and especially
2-methyl-indole.

There may also be mentioned pyrazoles, especially those of the formula (5)
$$\begin{array}{c} H-C\!\!-\!\!-\!\!-\!\!-\!\!C-R_2 \\ \| \quad\quad \| \\ Z-C \quad\quad N \\ \diagdown_N\diagup \\ | \\ R_1 \end{array}$$

in which $R_1$ represents a hydrogen atom or an alkyl, hydroxyalkyl, cyanalkyl or carboxyalkyl radical containing at most 6 carbon atoms, or a benzene radical, $R_2$ represents a hydrogen atom or an alkyl group containing at most 4 carbon atoms or a carboxyalkyl group containing an alkyl radical having at most 4 carbon atoms, and Z represents a hydroxyl or amino group. As examples there may be mentioned:

3-methyl-pyrazolone-(5),
1:3-dimethyl-pyrazolone-(5),
1-butyl-3-methyl-pyrazolone-(5),
1-hydroxyethyl-3-methyl-pyrazolone-(5),
1-cyanethyl-3-methyl-pyrazolone-(5),
1-phenyl-3-methyl-pyrazolone-(5),
1-(ortho-chlorophenyl)-3-methyl-pyrazolone-(5),
3-carboxymethoxy-pyrazolone-(5) and especially
1-phenyl-5-aminopyrazole.

As a further heterocyclic coupling component there may be mentioned:

N-ethyl-3-hydroxy-7-methyl-1:2:3:4-tetrahydroquinoline.

The aforesaid amines serving as diazo-components can be diazotized by methods in themselves known, for example, with the use of a mineral acid, especially hydrochloric acid, and sodium nitrite.

The coupling can also be carried out by a method in itself known, for example, in a neutral to acid medium, and, if desired, in the presence of sodium acetate or other buffer substance capable of influencing the speed of coupling, or a catalyst, for example, pyridine or a salt thereof.

In the form of the process described under (b) the dyestuff of the general Formula 3 containing a halogenacyl group is reacted with a secondary or tertiary amine, for example, dimethylamine, trimethylamine, triethylamine, triethanolamine, dimethyl-cyclohexylamine, or pyridine, advantageously by heating the dyestuff in an excess of the amine in the presence or absence of a solvent. The dyestuffs of the Formula 3 are advantageously obtained by coupling a diazo-compound of an aminohalogen-acyl-benzene, for example, 4-amino-1-chloracetylbenzene or 4-amino-1-β-chloropropionyl-benzene, with one of the aforesaid diazo-components.

In the process described under (c) there are advantageously used as starting dyestuffs of the Formula 4 those in which $R_1$ and $R_2$ represents alkyl radicals. These dyestuffs are treated with an alkylating agent, advantageously with an alkyl halide or aralkyl halide or an alkyl or aralkyl ester of sulfuric acid or of an organic sulfonic acid. As examples of alkylating agents there may be mentioned methyl chloride, methyl bromide, methyl iodide, benzyl chloride, trimethyloxonium borofluoride, dimethyl sulfate, diethyl sulfate, benzene sulfonic acid methyl ester and para-toluene sulfonic acid ethyl or butyl ester. The alkylation is advantageously carried out by heating the reactants in an inert organic solvent, for example, a hydrocarbon such as benzene, toluene or xylene, a halogen-hydrocarbon such as carbon tetrachloride, tetrachlorethane, chlorobenzene or orthodichlorobenzene, or a hydrocarbon such as nitromethane, nitrobenzene or nitronaphthalene. There may also be used acid anhydrides, acid amides or nitriles, such as acetic anhydride, dimethyl-formamide or acetonitrile, or there may be used dimethyl sulfoxide. Instead of an inert solvent there may be used a large excess of the alkylating agent. In this case care must be taken that the mixture is not overheated, because the reaction is strongly exothermic. Nevertheless, it is necessary in most cases, especially in the presence of an organic solvent, to heat the reaction mixture externally in order to initiate the reaction. In certain cases the alkylation may be carried out in an aqueous medium or with the use of an alcohol, if desired in the presence of a small proportion of potassium iodide.

In the case of azo-dyestuffs, which contain only tertiary nitrogen atoms in the aliphatic radical, the alkylation causes quaternation of the nitrogen atom, so that a quaternary ammonium group is formed. When the azo-dyestuff contains a primary or secondary aliphatically bound amino group, alkylation first leads to the formation of the tertiary amine and then to quaternation. To obtain a good yield it is in all cases of advantage to use an excess of the alkylating agent. If desired, the acid formed by the alkylation of a primary or secondary amino group may form a salt with an added strongly tertiary base which is incapable of being alkylated for steric reasons, such as ethyl-di-isopropylamine.

The dyestuff salts are advantageously purified by dissolution in water, and any unreacted starting dyestuff can be filtered off as an insoluble radical. From the aqueous solution the dyestuff can be precipitated by the addition of a water-soluble salt, for example, sodium chloride.

The dyestuffs of the invention advantageously contain as the anion the radical of a strong acid, for example, sulfuric acid or a semi-ester of sulfuric acid or an arylsulfonic acid, or a halogen ion. The aforesad anions introduced into the dyestuff molecule during the process may be exchanged for anions or other inorganic acids, for example, phosphoric acid, sulfuric acid or an organic acid, for example, formic acid, acetic acid, chloracetic acid, oxalic acid, lactic acid or tartaric acid. In certain cases the free bases may be used. The dyestuff salts can also be used in the form of double salts, for example, with halides of metals of the second group of the periodic system, and especially zinc chloride or cadium chloride.

The dyestuff salts of this invention are suitable for dyeing or printing a very wide variety of materials, for example, tanned cellulose fibers, silk, hair, leather or fully synthetic fibers, especially polyacrylonitrile fibers or fibers of polyvinylidene cyanide (Darvan). The dyeings produced on these fibers are distinguished by their excellent fastness to light, even in the case of pale tints. As compared with known dyestuffs of comparable structure the dyestuffs of the invention have the advantage that the shade of the dyeings produced therewith is to a very great extent independent of the pH-value of the dyebath. Furthermore, the dyeings retain their tint when the dyed material mixed with wool is carbonised.

The following examples illustrate the invention, the parts and percentages being by weight:

*Example 1*

A solution of 22.8 parts of 4-amino-α-(N-chloro-trimethylamino)-acetophenone in 170 parts of water and 50 parts of hydrochloric acid of 30% strength is diazotised at 0 to 5° C. with 100 parts of a 1 N-solution of nitrite. The diazo-solution is run into a solution of 13.2 parts of 2-methyl-indole in 54 parts of glacial acetic acid. By the cautious addition of a saturated solution of sodium acetate the dyestuff of the formula

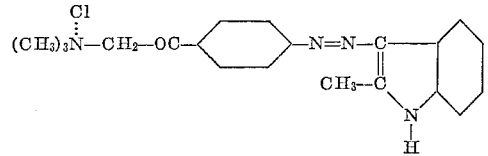

is precipitated. The dyestuff dyes polyacrylonitrile fibers yellow tints that are fast to light.

By using, instead of 2-methyl-indole, 1:2-dimethyl-indole or 2-phenyl-indole, there are obtained similar dyestuffs which dye polyacrylonitrile fibers reddish yellow or orange tints.

The 4 - amino-α-(N-chlorotrimethylamino)-acetophenone is a known compound and can be obtained by reacting acetylaminobenzene with chloracetyl chloride in the presence of aluminum chloride in carbon disulfide, reacting the resulting 4-acetyl-amino-α-chloracetophenone with an aqueous solution of trimethylamine, and splitting off the acetyl group with the aid of heat in aqueous hydrochloric acid.

By using, instead of 2-methyl-indole, the indoles given below there are obtained dyestuffs which dye polyacrylonitrile fibers the following tints:

| | |
|---|---|
| 1,2-dimethyl-indole | Orange. |
| 2-phenyl-indole | Orange. |
| 1-methyl-2-phenyl-indole | Strong reddish yellow. |
| 2-methyl-7-chlorindole | Yellow. |
| 2-methyl-5-chlorindole | Greenish yellow. |
| 2-methyl-5-bromindole | Yellow. |
| 2:5-dimethyl-indole | Yellow. |

Example 2

30 parts of the dyestuff of the formula

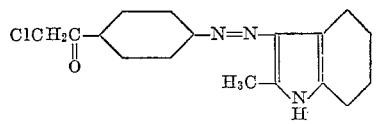

are dissolved in 800 parts of acetone. While cooling and stirring, a gentle stream of trimethylamine is run in in the course of 3 hours. The precipitated dyestuff is filtered off with suction. It is completely soluble in water and has the same properties as the dyestuff obtained as described in Example 1.

Example 3

A solution of 25.9 parts of 4-amino-α-(N-chloro-dimethyl-ethanolamine)-acetophenone in 150 parts of water, and 50 parts of hydrochloric acid of 30% strength is diazotized at 0 to 5° C. with 100 parts of a 1 N-solution of nitrite. The clear solution is added to a suspension of 19.3 parts of 2-phenyl-indole in 200 parts of alcohol, and the whole is stirred for 7 hours while cooling with ice. The dyestuff formed has the formula

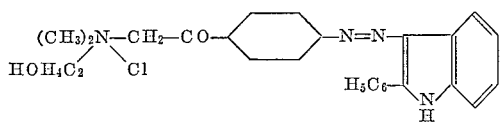

and is a brown powder, which dyes polyacrylonitrile fibers orange tints which are very fast to light.

The 4-amino-α-(N-chloro-dimethylethanolamino)-acetophenone is obtained in known manner by quaternating 4-acetylamino-ω-chloracetophenone with dimethylethanolamine and subsequently hydrolysing the product.

By using in this example 4-amino-α-(N-bromo-dimethylbenzylamino)-acetophenone there is obtained a similar dyestuff.

Example 4

24.3 parts of 1-amino-methylbenzene-5-acetyl-trimethyl-ammonium chloride are diazotised in the manner described in Example 1, and the diazo compound is coupled with a solution of 13.2 parts of 2-methyl-indol in 40 parts of hydrochloric acid of 36% strength. By the addition of 100 parts of sodium chloride and 10 parts of zinc chloride the dyestuff of the formula

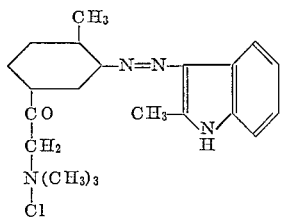

is precipitated. It dyes polyacrylonitrile fibers yellow tints that are fast to light.

The diazo-component is obtained by quaternating 1-acetyl-amino-2-methyl-5-(α - chloro)-acetophenone with trimethylamine and subsequently splitting off the acetyl group with hydrochloric acid.

By using in this example as diazo-component 1-amino-3-chloro-4 - α - (N-chloro-trimethylamino)-acetophenone there is obtained a dyestuff having similar properties.

Example 5

22.8 parts of 4-amino-α-(N-chloro-trimethylamino)-acetophenone are diazotised as described in Example 1. The clear diazo-solution is added dropwise to a solution of 15.9 parts of 1-phenyl-5-aminopyrazole in 20 parts of glacial acetic acid and 10 parts of water at 0 to 5° C. When the coupling is complete, the dyestuff suspension is neutralized with a saturated solution of sodium acetate. The dyestuff is filtered off and has the formula

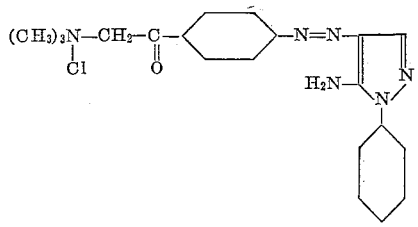

It is a yellow powder which dyes polyacrylonitrile fibers pure yellow tints that are fast to light.

Example 6

In a manner analogous to that described in the above example 26.5 parts of 4-amino-β-(N-chloro-pyridino)-propiophenone are diazotised and coupled with 19.4 parts of 1-(4'-chloro)-phenyl-5-aminopyrazole. The dyestuff so obtained has the formula

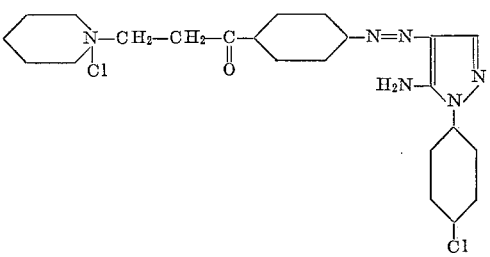

and possesses properties similar to those of the dyestuff obtained as described in Example 4.

Example 7

11.4 parts of 4-amino-α-(N-chloro-trimethylamino)-acetophenone are diazotised in the usual manner. Into the diazo-solution is run a solution of 11 parts of 1-cyan-ethyl-2:6-dimethyl-indoline in 30 parts of glacial acetic acid, while cooling with ice. The coupling is terminated by the addition of a saturated solution of sodium acetate. The dyestuff formed has the formula

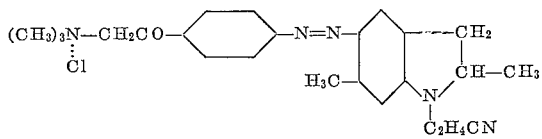

and is salted out with 30 parts of sodium chloride. It dyes polyacrylonitrile fibers orange-red tints that are fast to light.

The coupling component is obtained by reducing 2:6-dimethyl-indole with tin and hydrochloric acid and cyanthylating the resulting 2:6-dimethyl-dihydroindole with an excess of acrylonitrile under pressure. It boils at 115 to 120° C. under 0.3 mm.

The coupling components mentioned in column I of the following table yield when coupled with the diazo-component of paragraph 1 dyestuffs which dye polyacrylonitrile fibers the tints given in column II.

| | I | II |
|---|---|---|
| (1) | 1-methyl-3-hydroxytetrahydroquinoline | red. |
| (2) | 1-ethyl-7-methyl-3-hydroxytetrahydroquinoline | bluish red. |
| (3) | 1-butyl-3-hydroxytetrahydroquinoline | red. |
| (4) | 3-hydroxytetrahydro-7-hydroxynaphthoquinoline | bordeaux. |
| (5) | tetrahydroquinoline | scarlet. |
| (6) | 1-cyanethyltetrahydroquinoline | Do. |
| (7) | 1-cyanethyl-2-methyl-indoline | Do. |
| (8) | 1-cyanethyl-hexahydrocarbazole | Do. |

Example 8

1 part of the dyestuff salt obtained as described in Example 1 is dissolved in 500 parts of water with the addition of 5 parts of acetic acid of 40% strength. 100 parts of a boiled yarn of polyacrylonitrile staple fibers are entered into the dyebath, the temperature is raised to the boil in the course of ¼ hour, and boiling is continued for one hour. At the end of this period the dyebath is completely exhausted. The dyeing is rinsed and dried, and there is obtained a reddish yellow dyeing of extremely good fastness to light.

What is claimed is:

1. A water-soluble monoazo-dyestuff of the formula

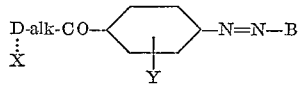

in which "alk" is an alkylene group having from 1 to 2 carbon atoms, X is an anion, D is a member selected from the group consisting of pyridinium and

wherein each of $R_1$, $R_2$ and $R_3$ is a member selected from the group consisting of lower alkyl, lower hydroxy alkyl and benzyl groups, Y is a member selected from the group consisting of hydrogen and methyl and B the radical of a coupling component selected from the group consisting of the formulae

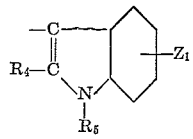

and

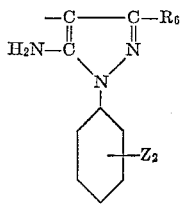

in which $R_4$ is a member selected from the group consisting of hydrogen, methyl and phenyl, $R_5$ is a member selected from the group consisting of hydrogen and methyl, $R_6$ is a member selected from the group consisting of hydrogen and methyl, $Z_1$ is a member selected from the group consisting of hydrogen, methyl, chlorine and bromine, and $Z_2$ is a member selected from the group consisting of hydrogen and chlorine.

2. The dyestuff of the formula

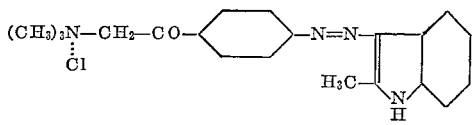

3. The dyestuff of the formula

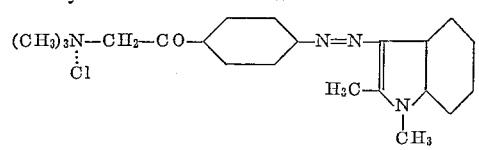

4. The dyestuff of the formula

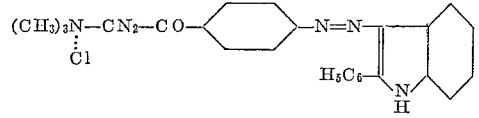

5. The dyestuff of the formula

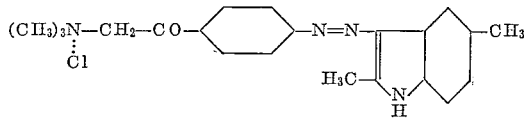

6. The dyesuff of the formula

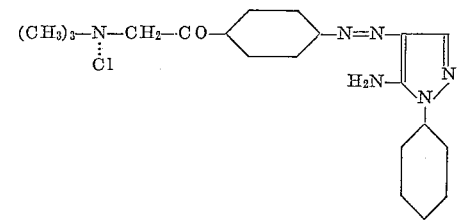

7. Dyestuff of the formula

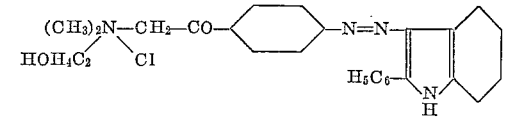

8. Dyestuff of the formula

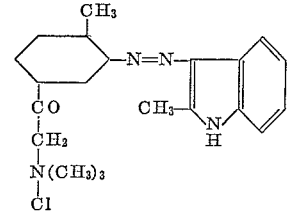

9. Dyestuff of the formula

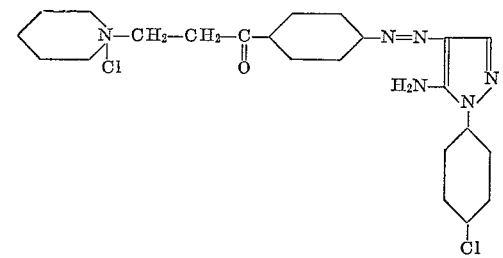

References Cited in the file of this patent
UNITED STATES PATENTS
2,965,631    Sartori _____ Dec. 20, 1960